United States Patent Office 2,763,650
Patented Sept. 18, 1956

2,763,650
DERIVATIVES OF 4:4'-DIAMINOSTILBENE-DISULFONIC ACID-(2:2') AND PROCESS OF MAKING SAME

Franz Ackermann, Binningen, Switzerland, assignor to Ciba Limited, Basel, Switzerland, a Swiss firm No Drawing. Application April 30, 1951,
Serial No. 223,826
3 Claims. (Cl. 260—249.6)

The present invention relates to the manufacture of new derivatives of 4:4'-diamino-stilbene-disulfonic acid-(2:2') of the general formula

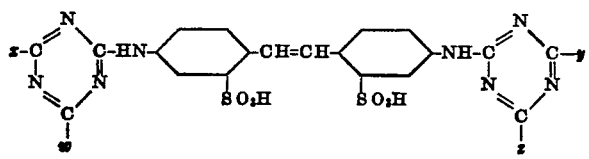

wherein $w$ and $z$ each represents an amino group in which at least one hydrogen atom is replaced by an unsubstituted lower alkyl radical containing at least two carbon atoms, and $x$ and $y$ each represents the radical of a monocyclic aryl amine.

According to one feature of the invention compounds of the formula set forth above are obtained when 2 mols (the expression "mol" herein means molecular proportion) of cyanuric chloride or cyanuric bromide are reacted in any sequence with (a) one mol of 4:4'-diaminostilbenedisulfonic acid-(2:2'), or a water soluble salt thereof, (b) 2 mols of an unsubstituted alkylamine of low molecular weight containing at least one radical with at least two carbon atoms and (c) 2 mols of a monocyclic aryl amine.

According to a further feature of the invention the same compounds are also obtained by starting from a 4-amino-stilbene-disulfonic acid-(2:2') which contains in the 4'-position a group convertible into an amino group, such as an acylamino or nitro group.

When the 4-nitro-4'-aminostilbene-disulfonic acid-(2:2') is used as starting material, 1 mol of cyanuric chloride or cyanuric bromide is reacted in any sequence with 1 mol of this acid or of a water-soluble salt thereof and with a total of 1–2 mol of the compounds set forth above under (b) and (c), the nitro group of the condensation product produced is reduced to the amino group and one further mol of cyanuric chloride or cyanuric bromide is reacted in any sequence with one mol of the amino compound thus produced and with 2–3 mols of the compounds specified under (b) and (c), the reaction components being employed in the molecular ratio determined by the prescribed constitution of the end product.

The new compounds of the formula set forth, and also their salts, have no dyestuff character but they possess, in accordance with their constitution, a more or less pronounced affinity for various substrata, as for example vegetable and animal fiber. On these substrata they have a blue to violet fluorescence in ultra-violet light. On account of these properties the products of the invention are capable of increasing the white content of undyed material and the purity of shade in the case of dyed material.

As unsubstituted alkylamines of low molecular weight containing at least one radical with at least two carbon atoms which provide the substituents $w$ and $z$ of the general formula set forth above there are concerned mono- and dialkylamines. There may be mentioned ethylamine, propylamine, butylamine, dipropylamine, dibutylamine, and furthermore amines with branched chains, such as isopropylamine, isobutylamine and diisobutylamine.

As salts of the products of the invention there are primarily concerned the water-soluble salts with ammonia or amines but preferably the alkali salts.

The manufacture of the new derivatives of 4:4'-diaminostilbene-disulfonic acid-(2:2') according to the invention may for example be carried out in such a manner that 2 mols of cyanuric chloride are reacted according to the general known methods for the reaction of this compound with amines, for example in the presence of water or of mixtures of water with organic solvents, such as acetone and if desired in the presence of buffer substances or acid-binding agents, such as sodium acetate, alkali carbonates or alkali hydroxides, with one mol of 4:4'-diaminostilbene-disulfonic acid-(2:2') or a water-soluble salt thereof, and the 4:4'-bis-[2:4-dichloro-1:3:5-triazyl-(6)-amino]-stilbene-disulfonic acid-(2:2') or water-soluble salt thereof produced subsequently reacted, if desired in the presence of buffer substances or acid-binding agents, with 2 mols of an alkylamine or a dialkylamine of the given definition and with 2 mols of a monocyclic arcyl amine.

If the 4-nitro-4'-amino-stilbene-disulfonic acid-(2:2') is used as starting material it may be condensed in the known manner with cyanuric chloride to the 4-nitro-4'-[2:4-dichloro-1:3:5-triazyl-(6)-amino]-stilbene-disulfonic acid-(2:2'), whereupon at least one of the two chlorine atoms is replaced by reaction with compounds specified above under (b) and (c).

It is also possible to replace 1 or 2 chlorine atoms of the cyanuric chloride initially by reaction with 1–2 mol of compounds specified under (b) and (c) above and subsequently to carry out the condensation with the 4-nitro-4'-amino-stilbene-disulfonic acid-(2:2').

Subsequently the nitro group in the condensation product thus obtained is converted by reduction, for example with iron in the presence of an acid, to the amino group, and this in turn again substituted in an analogous manner to that described above for the other amino group, the complete process being such that altogether at least one mol of one of the compounds set forth above under (b) and a total of 4 mols of the compounds set forth above under (b) and (c) taken together are brought into reaction, the reaction components being employed in the molecular ratio determined by the prescribed constitution of the end products.

The application of the new products rendered available by the present invention may take place in such a manner that the material to be treated is saturated with solutions, especially aqueous solutions, of the specified compounds and, after hydro-extracting or squeezing out, dried. For example white goods, especially after a wash conducted in the customary manner, may be after-treated with the products of the invention. Furthermore the new products may be employed for the after-treatment of printed cellulosic materials.

The compounds rendered available by the present process may also be added in the course of the process of manufacture of the material to be treated, for example by introducing them into paper pulp.

In general small quantities of the products of the invention suffice in order to obtain the desired result.

The compounds obtainable by the present process can also be applied in admixture with auxiliary substances such as are used for the improvement of fibrous materials, for example in conjunction with washing agents (for example together with soaps, salts of sulfonate washing agents, as for example of sulfonated benzimidazoles substituted on the 2-carbon atom by higher alkyl radicals, or also of monocarboxylic acid esters of 4-sulfophthalic acid with higher fatty alcohols, furthermore together with fatty alcohol sulfonates or condensation products of higher fatty acids with aliphatic hydroxy or amino sulfonic acids). In this manner the materials to be improved can be simultaneously washed and bleached. A particularly pronounced brightening effect is achieved when undyed vegetable fibers, especially cotton, are treated with mixtures containing such washing agents.

As materials which can be improved according to this process the following may for example be mentioned:

Nitrogen-containing natural and artificial materials such as wool, silk or synthetic polyamide fibers; also cellulosic materials such as cellulose or paper and further textile materials of cotton, linen or regenerated cellulose, including staple fiber; finally synthetic materials produced for example by polymerization. The best effects are however produced by the application of the present process to vegetable fibers. The material to be improved may exist in any form, for example in the form of fibers or also as film. The material may in addition be undyed, dyed or printed.

The following examples illustrate the invention the parts and percentages being by weight unless otherwise stated and the relation between parts by weight and parts by volume being the same as that between the kilogram and the liter.

Example 1

51 parts of o-chloraniline are added while stirring at 35–40° C. to a solution in 700 parts of water of 72.7 parts of the disodium salt of 4:4' - bis - [2 - ethylamino - 4 - chloro - 1:3:5 - triazyl - (6) - amino] - stilbenedisulfonic acid - (2:2') (prepared by condensation of 2 mols of cyanuric chloride with 1 mol of 4:4'-diaminostilbenedisulfonic acid-(2:2') and 2 mols of monoethylamine). The temperature of the reaction mixture is then raised to 80° C. in the course of 2 hours and the mixture stirred for 8 hours at 80–90° C. Sodium carbonate solution is then added until the reaction is distinctly alkaline, the mixture is allowed to cool to 15–20° C. and sodium chloride is then added. The precipitated disodium salt of 4:4' - bis - [2 - ethylamino - 4 - o - chloranilino - 1:3:5 - triazyl - (6) - amino] - stilbene - disulfonic acid - (2:2') of the formula

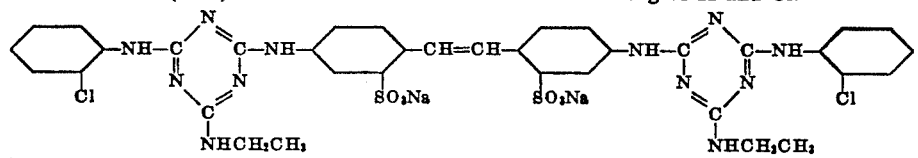

is separated by filtration, washed with sodium chloride solution and dried. The new product is a pale yellow, water soluble powder.

When instead of the 51 parts of o-chloraniline equivalent quantities of aniline, o-anisidine or p-anisidine are used, compounds with similar properties are obtained. The products can be used as brightening agents for textiles and paper.

Example 2

Undyed cotton yarn is treated in a bath ratio of 1:30 for about ¼ hour at room temperature in a bath which contains per liter 0.01 gram of the condensation product obtained according to Example 1. After rinsing and drying the yarn thus treated has a higher white content than the corresponding untreated material.

Example 3

Undyed woolen material is treated in a bath ratio of 1:40 for ½ hour at 40–45° C. in a bath which contains per liter 0.05 gram of the condensation product obtained according to Example 1 and 1.25 grams of formic acid. After rinsing and drying the wool thus treated possesses a higher white content than the untreated starting material.

Example 4

At a liquor ratio of 1:40, cotton is washed in a boiling bath containing 10 grams of a washing agent of the following composition:

|  | Percent |
|---|---|
| Soap | 33.3 |
| Calcined soda | 11.0 |
| Sodium pyrophosphate | 14.0 |
| Sodium perborate | 7.0 |
| Magnesium silicate | 3.0 |
| The product of Example 1 | 0.04 |
| Water | 31.66 |
|  | 100.00 |

After this, the material is rinsed and dried.

The cotton so treated has a whiter apearance than cotton washed with a washing agent not containing the product of Example 1, but being the same otherwise.

What is claimed is:

1. An optical bleaching agent consisting essentially of an alkali salt of a 4:4'-diaminostilbene-disulfonic acid-(2:2') of the formula

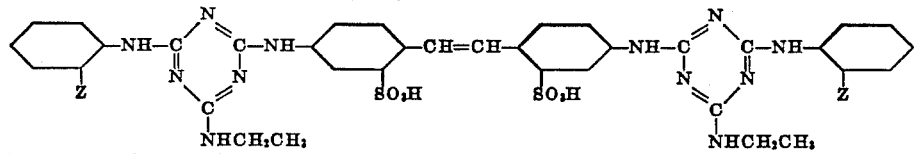

wherein Z is a member selected from the group consisting of H and Cl.

2. An optical bleaching agent consisting essentially of an alkali salt of 4:4'-bis-[2-ethylamino-4-o-chloranilino-1:3:5-triazyl-(6)-amino]-stilbene-disulfonic acid-(2:2') of the formula

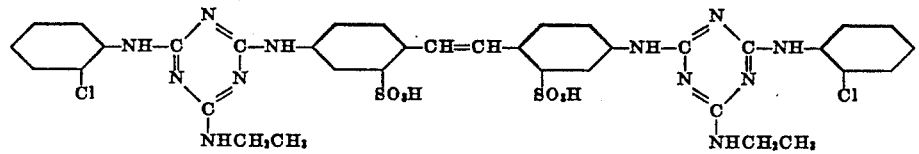

3. An optical bleaching agent consisting essentially of an alkali salt of 4:4'-bis-[2-ethylamino-4-anilino-1:3:5-triazyl-(6)-amino]-stilbenedisulfonic acid-(2:2') of the formula

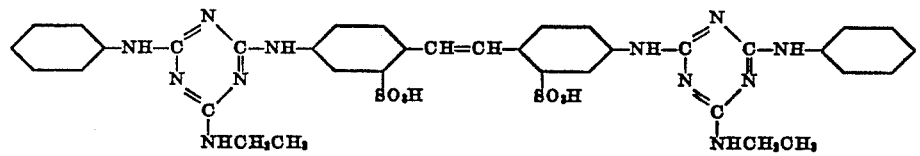

(References on following page)

References Cited in the file of this patent

UNITED STATES PATENTS

| | | |
|---|---|---|
| 564,835 | Newman | July 28, 1896 |
| 2,171,427 | Eggert | Aug. 29, 1939 |
| 2,221,361 | Schmidt | Nov. 12, 1940 |
| 2,368,844 | Keller | Feb. 6, 1945 |
| 2,376,743 | Wendt | May 22, 1945 |
| 2,473,475 | Keller | June 14, 1949 |
| 2,539,766 | Ziveidler | Jan. 30, 1951 |
| 2,595,030 | Wallace | Apr. 29, 1952 |
| 2,612,501 | Wilson | Sept. 30, 1952 |
| 2,666,054 | Williams | Jan. 12, 1954 |

FOREIGN PATENTS

| | | |
|---|---|---|
| 624,052 | Great Britain | May 1949 |

OTHER REFERENCES

Ser. No. 381,856, Wendt (A. P. C.), published May 11, 1943.